United States Patent
Pavlyushchik

(10) Patent No.: US 8,099,785 B1
(45) Date of Patent: Jan. 17, 2012

(54) METHOD AND SYSTEM FOR TREATMENT OF CURE-RESISTANT COMPUTER MALWARE

(75) Inventor: Mikhail A. Pavlyushchik, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 779 days.

(21) Appl. No.: 11/743,730

(22) Filed: May 3, 2007

(51) Int. Cl.
*G06F 21/00* (2006.01)

(52) U.S. Cl. ........... 726/24; 726/22; 726/23; 726/25

(58) Field of Classification Search .......... 720/22–25; 726/22–25
See application file for complete search history.

(56) References Cited

U.S. PATENT DOCUMENTS

| | | | |
|---|---|---|---|
| 5,511,184 A | 4/1996 | Lin | |
| 5,613,002 A | 3/1997 | Kephart et al. | |
| 5,889,943 A | 3/1999 | Ji et al. | |
| 5,899,430 A | 5/1999 | Malakates et al. | |
| 5,918,008 A | 6/1999 | Togawa et al. | |
| 6,550,007 B1 | 4/2003 | Baxter et al. | |
| 7,360,249 B1* | 4/2008 | Szor et al. | 726/22 |
| 2003/0079158 A1* | 4/2003 | Tower et al. | 714/23 |
| 2003/0105973 A1 | 6/2003 | Liang et al. | |
| 2005/0091538 A1 | 4/2005 | Hoche et al. | |
| 2005/0120238 A1 | 6/2005 | Choi | |
| 2006/0075501 A1* | 4/2006 | Thomas et al. | 726/24 |
| 2006/0150256 A1* | 7/2006 | Fanton et al. | 726/27 |
| 2006/0212940 A1* | 9/2006 | Wilson | 726/22 |
| 2007/0067842 A1* | 3/2007 | Greene et al. | 726/24 |
| 2007/0276823 A1* | 11/2007 | Borden et al. | 707/5 |
| 2007/0283438 A1* | 12/2007 | Fries et al. | 726/24 |
| 2007/0289019 A1* | 12/2007 | Lowrey | 726/24 |
| 2010/0043072 A1* | 2/2010 | Rothwell | 726/24 |

FOREIGN PATENT DOCUMENTS

| | | |
|---|---|---|
| CN | 1245927 | 3/2000 |
| CN | 1310393 | 8/2001 |
| CN | 1525333 | 9/2004 |
| EP | 0560277 | 9/1993 |
| JP | 2001154970 | 6/2001 |
| JP | 2006048719 | 2/2006 |
| WO | 9739399 | 10/1997 |
| WO | 9841919 | 9/1998 |
| WO | 02084459 | 10/2002 |
| WO | 2004090733 | 10/2004 |

* cited by examiner

*Primary Examiner* — Vivek Srivastava
*Assistant Examiner* — Anthony Brown
(74) *Attorney, Agent, or Firm* — Bardmesser Law Group

(57) ABSTRACT

A system, method and computer program product for treating a malware in a computer having multiple copies of the same malicious code activated, where the multiple copies monitor each other's existence, including (a) identifying a presence of the malicious code on the computer; (b) blocking actions that permit one active copy of the malicious code to activate another copy of the malicious code; (c) deleting, from persistent storage, a file containing executable code of the malware; and (d) rebooting the computer. The actions include disabling writes to the persistent storage, disabling writes to a system registry, and/or blocking activation of new processes. The blocking utilizes a driver loaded into the kernel space. The identifying can use signature identification for malware detection.

21 Claims, 10 Drawing Sheets

METHOD AND SYSTEM FOR TREATMENT OF CURE-RESISTANT COMPUTER MALWARE

BACKGROUND OF THE INVENTION

1. Field of the Invention

The present invention is related to anti-malware technology, and more particularly, to curing computers of viruses and other types of malware that are designed to be cure-resistant.

2. Description of the Related Art

Today there are many different types of malware that present a serious threat to computers and computer networks. By infecting a computer and spreading through various mechanisms, such as e-mails, Internet relay chat, instant messenger, etc., the malware can thereby rapidly infect other computers as well. Such malware can range in their behavior from mildly benign, e.g., occasional displays of annoying messages to the user, to malicious and catastrophic, e.g., a complete corruption of the hard disk drive and the data stored on the drive, leading to a loss of data and a possible need to a complete restore of the operating system and application data from backup.

To detect and cure a computer of malware, a number of conventional mechanisms have been developed, for example, CN1310393, CN1525333, U.S. 2005/0091538, U.S. 2005/0120238, U.S. Pat. No. 5,613,002, WO 2004/090733 and others. These mechanisms primarily use malware signature identification and removal of the malware code from random access memory, as well as deletion of the viruses' executable files from the hard disk drive, which is usually sufficient for many purposes.

A fairly recent phenomenon of malware writing is the growing professionalization of malware writers. In the early days of networked computers and up until the early 2000s, many malicious programs were written by teenagers and college students, often as pranks. Others were written by adult hackers, who nonetheless rarely pursued commercial objectives. In recent years, this situation has dramatically changed. Although many examples of malicious code are still created by amateurs, or as pranks, a new category of malware writer has now entered the picture: highly qualified and skilled programmers, who exploit vulnerabilities in operating systems and network protocols for money. This has resulted in use of malware mechanisms for distribution of other malicious types of malware, for example, to zombify computers to act as spam sources, use of malware techniques for identity theft, phishing, and the like.

Professional malware writers subscribe to antivirus databases and services, which in essence accelerates an arms race between anti-virus vendors and malware writers. When a new version of a virus is distributed, it can take from several minutes to several hours for the databases of most major antivirus vendors to be updated and distributed to their users. In turn, the virus writers monitor this process, and as soon as they notice that their virus has been detected, a new version is immediately sent out.

Another recent phenomenon related to the professionalization of the malware-writing business is attempts by malware writers to write code that is exceedingly difficult to cure. In the early days of networked computers, malware creators cared little for this quality, since what mattered most for many amateur malware writers was to distribute the malware at the maximum speed to the greatest possible number of computers, which served as a test of manhood in the hacker community. With the commercialization of malware writing, this has also changed and professional malware writers often go to great lengths to ensure that the malware they write cannot be easily cured and removed.

Thus, there is a category of malware today that is intentionally designed to be cure-resistant. Typically such malware makes multiple copies of itself on the same computer and runs multiple copies of itself simultaneously using different threads. Thus, in such a scheme, a malicious program can have a copy of its code that has infected an Internet browser and running in one thread, and another copy of itself having infected an e-mail client running in a different thread and loaded into a different portion of the random access memory of the computer. When an anti-virus program detects one of the copies of the malicious program, for example, the copy that has infected the Internet browser, the anti-virus program deletes that copy from memory and deletes a copy of the executable file that contains the code of the malware.

In case of cure-resistant malware, the other copy of the malicious program (the copy that infected the e-mail client) detects that the first copy has been deleted and immediately copies itself back to the Internet browser's portion of random access memory, re-infecting the Internet browser and restarting the thread of its first copy. When the anti-virus software encounters the second copy of the malicious program (which infected the e-mail client), the anti-virus software deletes the malicious code from the e-mail client and deletes its copy of the executable file. However, the thread that executes the copy of the malicious program in the Internet browser will immediately detect this and re-infect the e-mail client. This phenomenon is familiar to those who have recently been victims of such cure-resistant malware, as well as to ordinary users, when the effect is that no matter how many times the user tries to "kill" the malicious program, some time later, it appears again.

For example, consider the situation where a computer is infected by a malicious program, its code is loaded into random access memory from a file, and the registry includes an appropriate key for the file. The situation is illustrated in FIG. 1. Shown in FIG. 1 are two malicious processes, such as viruses designated as MP1 and MP2. When the anti-virus software terminates Malicious Process 2, Malicious Process 1 restores the file from its own reserve copy, or from memory. Malicious Process 1 is then restarted. The anti-virus software then finds a registry key that identifies the virus file corresponding to Malicious Process 1 and removes this registry key. However, the virus again restores the registry key from its reserve copy or from memory. Then, the anti-virus software finds Malicious Process 2 and terminates it. However, Malicious Process 1 immediately restarts Malicious Process 2. The anti-virus then finds Malicious Process 1 and terminates it, but Malicious Process 2 then restarts Malicious Process 1.

As a result, the anti-virus software completes scanning the system being confident that the virus has been removed, however, as is clear from FIG. 1, the virus remains active by defeating the anti-virus software in this manner. Accordingly, there is a need in the art for a system and method for treating computers of cure-resistant malware.

SUMMARY OF THE INVENTION

The present invention is intended as a method and system to treat cure-resistant malware that substantially obviates one or several of the disadvantages of the related art.

In one aspect of the invention there is provided a system, method, and program product to treat a malicious program in a computer having multiple copies of the same malicious program activated where the multiple copies monitor one another's existence, by (a) identifying a presence of the malicious program on the computer; (b) blocking actions that permit one active copy of the malicious program to activate another copy; (c) deleting from persistent storage the file containing executable code of the malicious program; and (d) rebooting the computer. Such blocking actions can include disabling writes to the persistent storage, disabling writes to the system registry, and/or blocking activation of new processes. The blocking utilizes a driver loaded into the kernel space. The process can use signature identification for malware detection.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

There are numerous ways for processes or threads to determine whether another copy of itself is running For example, a malicious process can create a global object, and periodically check for its existence. Such a global object is therefore used for synchronization among multiple instances of the malicious process. Memory mapped files is another mechanism that multiple copies of the same malicious process can use to maintain awareness of whether the other process has been terminated. Opening a window is still another variation on this theme, particularly where the window is a hidden window, or one that has all the attributes of a window, except for the fact that it is not actually displayed on the monitor. In sum, modern operating systems contain different mechanisms that permit multiple malware instances to maintain awareness of whether another instance has been terminated, thereby determining whether it needs to restart the other instance.

In order to temporarily block the malicious code from reactivating the terminated copy of itself, the cure software can include blocking writing to the system registry, blocking writing to the hard disk drive, blocking any attempts to modify files on the hard disk drive, blocking attempts to launch new processes or threads, and so forth. It should be pointed out that while this block is in effect, "useful" processes, as far as the user is concerned, are also prevented from doing the same things; however, in a normal situation, the user would be warned that a "malware treatment routine requires system restart" through a message displayed by the anti-virus. Although theoretically it is possible that a restart is not necessary, the risk of the malicious process remaining without the system restart is relatively high, since ensuring that malicious code is fully removed from random access memory is an exceedingly difficult task, particularly where the malicious code is embedded in relatively innocuous system processes or system services, such as Internet browser, etc.

The processes discussed above, such as writing to system registry, writing to hard disk drive, launching new processes and threads, etc., can be blocked at the system level, using a special driver, or by any other applicable method. In this case, if a malicious code attempts to restart another copy of itself, this attempt is blocked.

Figure 1:
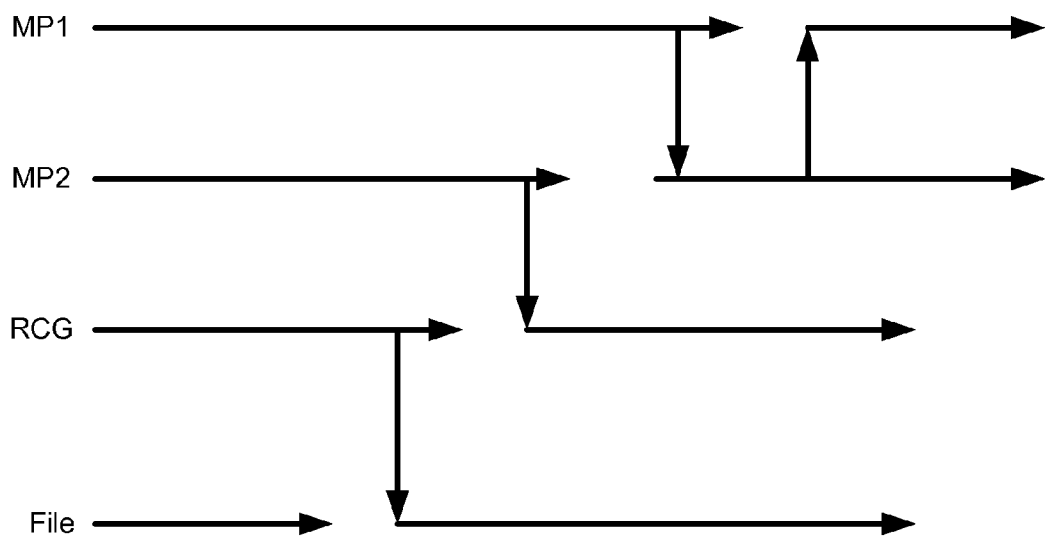
FIG. 1 illustrates the results of a malware treatment using conventional algorithms.
Figure 2:
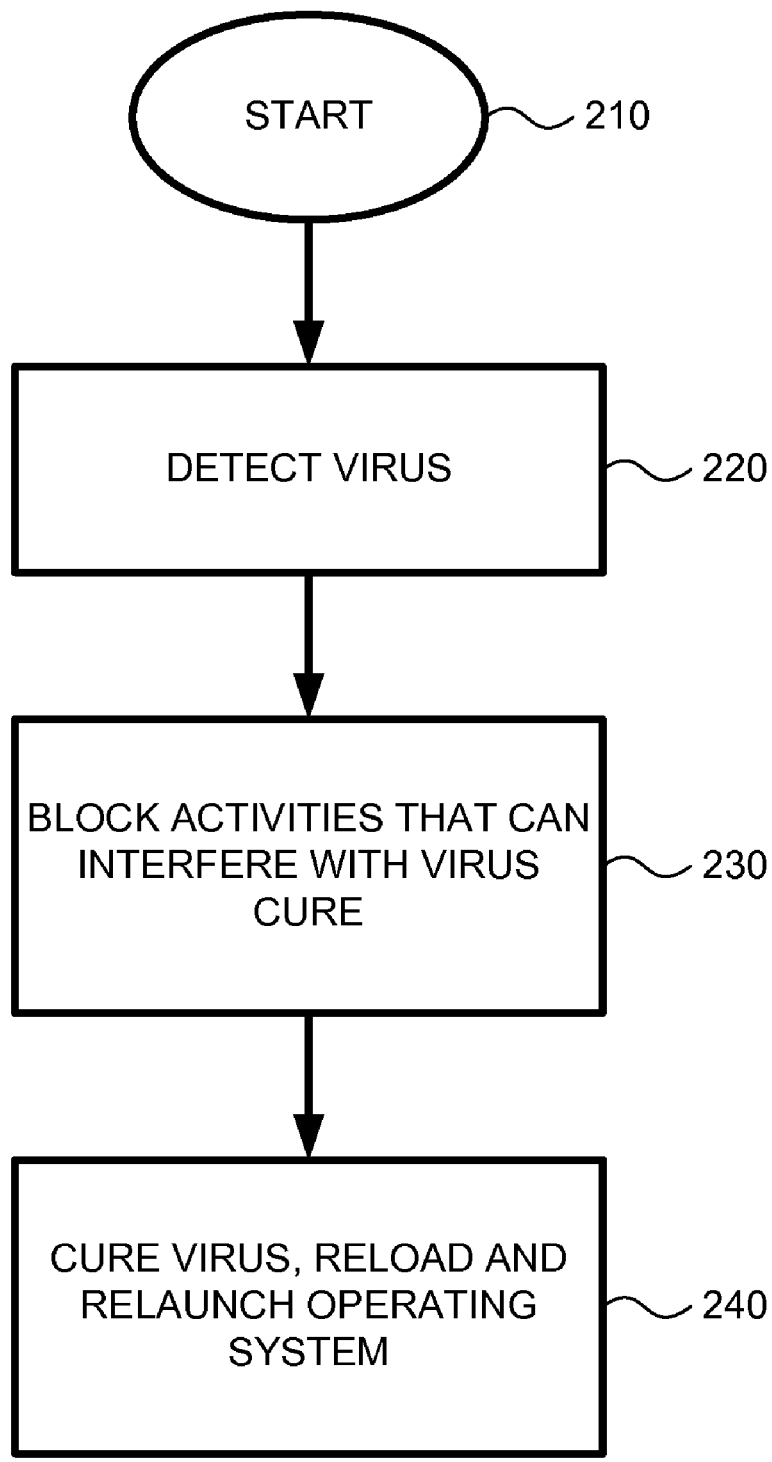
FIG. 2 illustrates an algorithm of a malicious program treatment according to one embodiment of the present invention.

As discussed earlier, what is needed in the art is a system and method for handling malware that have been intentionally designed to be cure-resistant. Such malware can be a virus, a trojan, a worm, a rootkit, an adware or spyware, although the example of a virus is sometimes used throughout this discussion. The process of curing such malware is illustrated in FIG. 2. As shown in FIG. 2, at first, the operating system of the computer is scanned and a malicious instance is detected (step 210), using any of the known methods for detecting malware. The most common malware detection technique is the signature method, described, for example, in U.S. Patent Publication No. 2006/0107055, U.S. Patent Publication No. U.S. 2006/0143713, U.S. Patent Publication No. 2006/0064755, U.S. Patent Publication No. 2005/0229254, and U.S. Pat. No. 5,765,030. Various commercial software programs relying on the signature method of malware detection, such as from Norton/Symantec, McAfee, Dr. Solomon, etc., are available. As will be apparent to one of the ordinary skill in the art, the present invention is not limited to any particular method of malware detection.

Once an infected file has been identified (step 220), before the start of removal/quarantine and treatment of that file, any activities which can hinder the treatment are blocked (step 230). As examples, writing to registry branches, launching of new processes and threads, new file creation and/or file modification can be blocked, etc. As is clear, this list is not necessarily exhaustive, and, depending on the system configuration and processor characteristics, other activities may also need to be blocked.

Once these activities have been blocked, the malicious code can now be treated. This can be performed by any of the mechanisms known in the art, for example, by removing the appropriate registry keys, deletion of the file from the hard disk drive, deletion of malware code from the random access memory, etc. Afterwards, the operating system is reloaded (step 240). Reloading the OS guarantees that the operating system code is now free of malware.

Figure 3A:
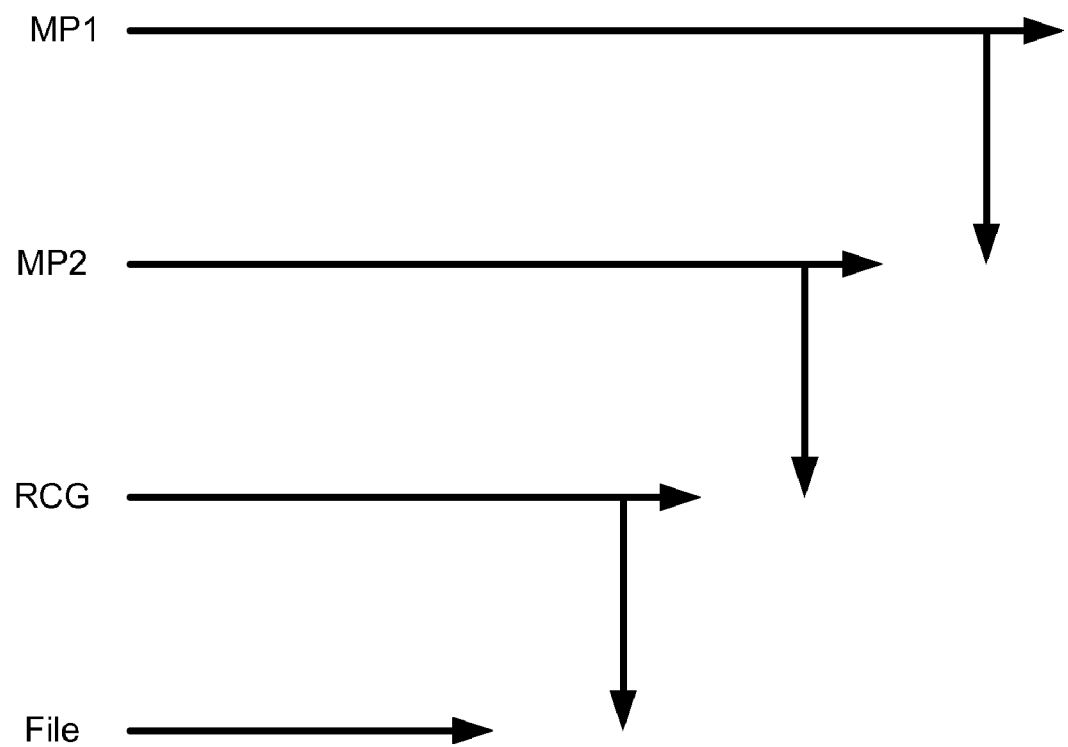
FIG. 3A illustrates the results of malware treatment according to one embodiment of the present invention.

Below, the proposed malware treatment process is discussed in more detail, and is illustrated in FIG. 3A. Consider the situation where the system has an infected file and a corresponding registry key for this file. The file attempts to execute the two processes—the first process is restoration of the removed file from a reserve copy, and the second process is restoring the key in the registry. As discussed earlier, at first, using an antivirus program, the operating system is scanned in order to detect the presence of the malicious code by using any of the known methods.

As a result of the scanning, the malware file is detected. Immediately, any activities that can interfere with the malware treatment process are blocked. The malicious file is then either cured of malware, or removed from the operating system.

Once the file has been removed, the second malicious instance, attempts to restore the file (see MP1). However, in this case restoration is impossible, because such activities as creation of a new file, or writing to a disk, are blocked.

Then the anti-virus software finds the registry key that corresponds to the infected file and removes it from the registry. The Malicious Process 1 (MP1) again attempts to restore this key, however, it is unable to do so, because the system is blocked from performing such activities, including, in this case, writing to the registry branches.

The anti-virus software finds the Malicious Process 2 (MP2), and identifies it as infected. As a result, the anti-virus software terminates this process. After this, the Malicious Process 1 (MP1) attempts to restart, but, due to the fact that start of new processes has been blocked, this process cannot restart. The anti-virus software then terminates the Malicious Process 1.

The anti-virus software finishes the scan of the system, and, after the steps performed above, and as shown in FIG. 3A, the malware is removed from the system.

Figure 3B:
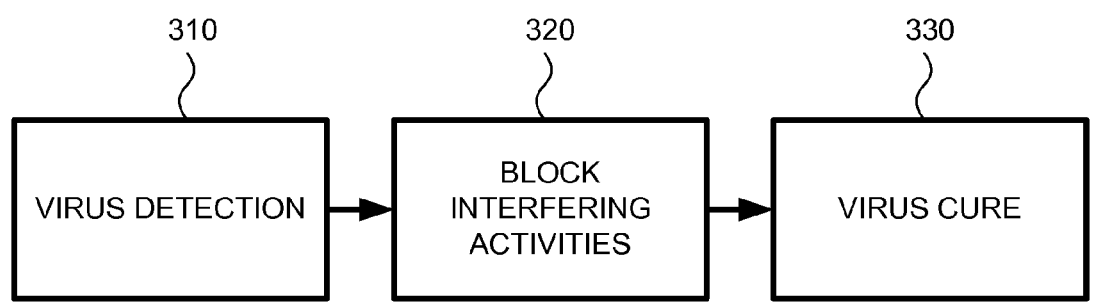
FIG. 3B illustrates one possible configuration of a system that embodies the present invention.

FIG. 3B illustrates one possible configuration of a system that embodies the present invention. As shown in FIG. 3B, the system includes a means for detecting the presence of a malware (310) which can be, as discussed earlier, any of the known mechanisms for malware detection. The system also includes a means for blocking activities that can prevent effective malware treatment (320), and a treatment means 330, such as a means for reloading the operating system from a trusted copy.

In the system shown in FIG. 3B, the malware detection means 310 first detects the presence of the malware. In the event of detection of an infected file, the means 310 then launches the blocking means 320. The blocking means 320 then executes the blocking of the activities which can prevent malware treatment. This can include blocking any attempts to write to the system branches of the registry, blocking the launching of new processes and threads, blocking creation of new files, and modification of existing files, etc. Once these processes are blocked, the means 330 executes the cure, which includes removal, quarantine, or disinfection of the infected file, as is known in the art. The means 330 also reloads the operating system, guaranteeing that the malware be removed from the system.

It should be noted that elements 310, 320 and 330 can be implemented in hardware, software, firmware, or in any of the ways in which computer executable operations and programs are implemented, and can be stored, for example, on a machine-readable medium.

Figure 4:
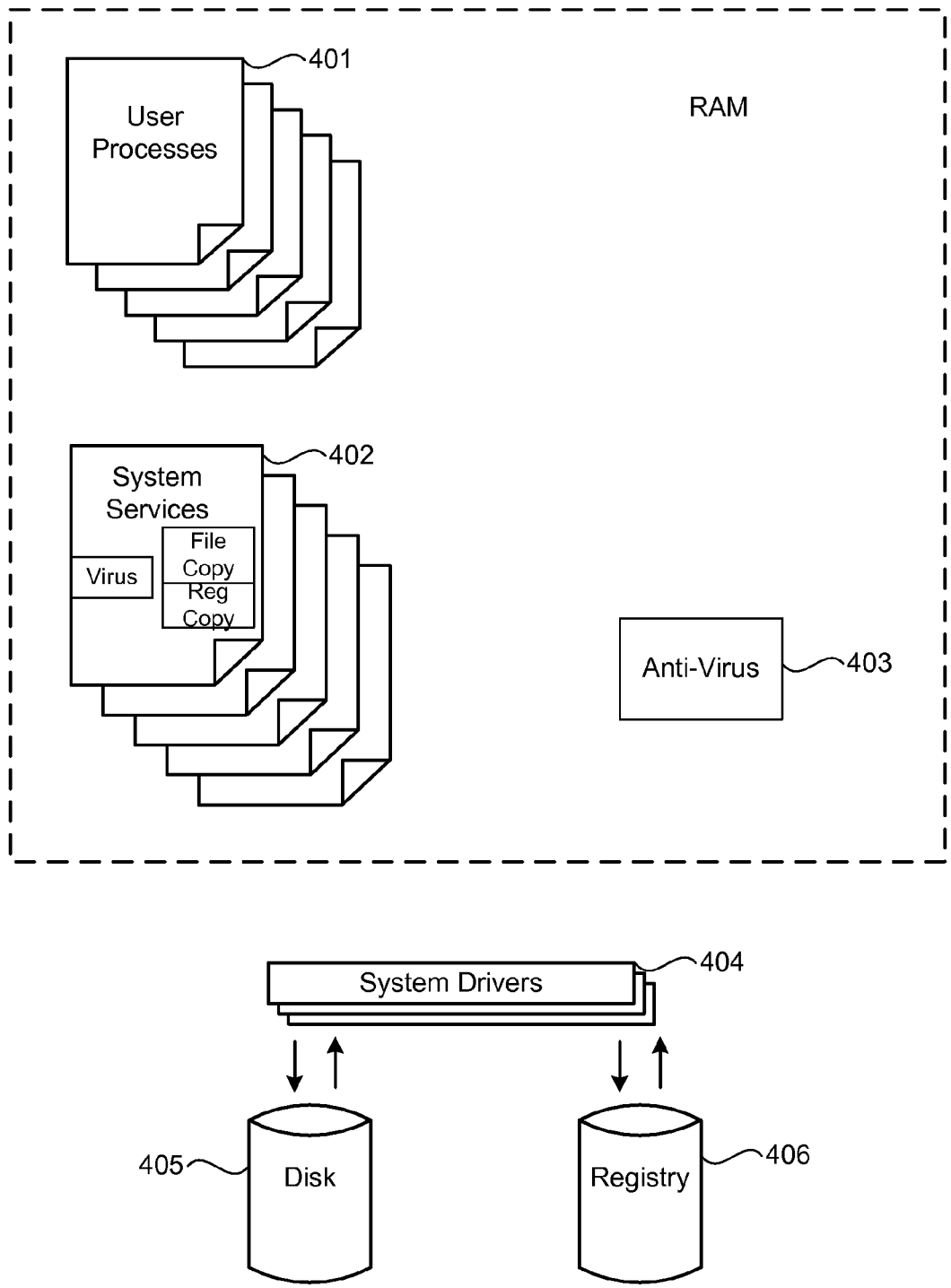
FIG. 4 illustrates, in a block diagram form, the relationships between the cure-resistant malicious program and various system components.

FIG. 4 illustrates, in a block diagram form, the relationship between the cure-resistant malware and various system components. As shown in FIG. 4, in a computer's random access memory (RAM), a number of user processes 401 run in user space, and some system services 402 run in kernel space. A hard disk drive 405 and a system registry 406 are accessed using system drivers 404. Antivirus software 403 is also run in the system space.

As is shown in FIG. 4, a malware loads a copy of its code into one of the system services 402. A cure-resistant malicious code also loads a copy of the executable file into the memory for use by the system services 402, as well as a copy of the registry key. Attempting to remove malicious code from the memory is often a very difficult, if not an impossible task, because attempting to modify system services code can frequently lead to a crash of a computer.

Figure 5:
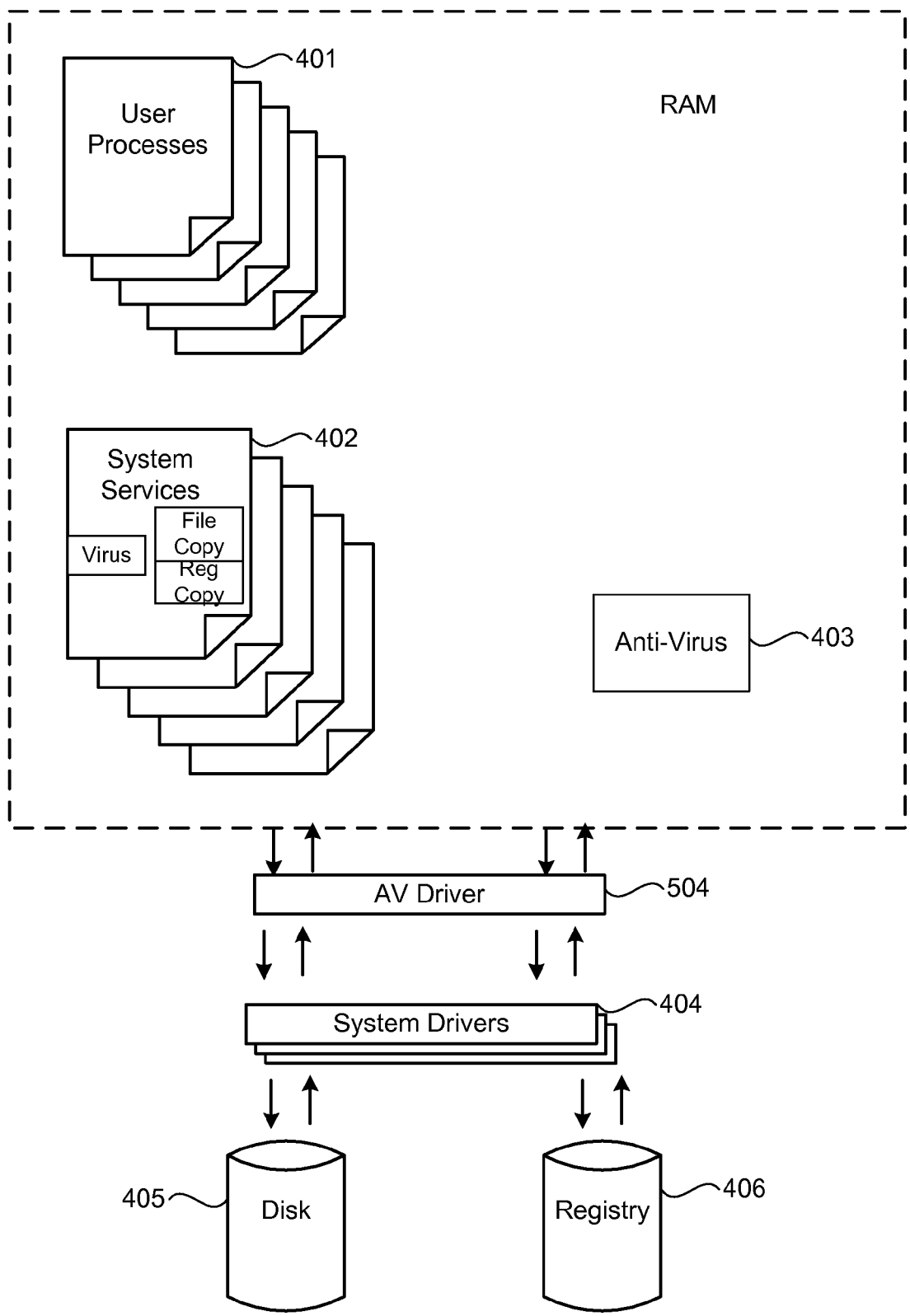
FIG. 5 illustrates an antivirus driver added to the operating system, according to one embodiment of the invention.

FIG. 5 illustrates one embodiment of the invention, where an antivirus driver 504 is added between the system drivers 405 and the user processes 401 and the system services 402, so that any attempt to write to the system registry 406 or the disk drive 405 is intercepted and blocked. The driver 504 therefore prevents one copy of the malicious code from restarting another copy of itself, or copying the executable file and registry keys to the hard disk drive and the system registry. The driver 504 is designed such that it does not block activities of the antivirus software itself, but blocks other activities that can result in re-infection.

Figure 6A:
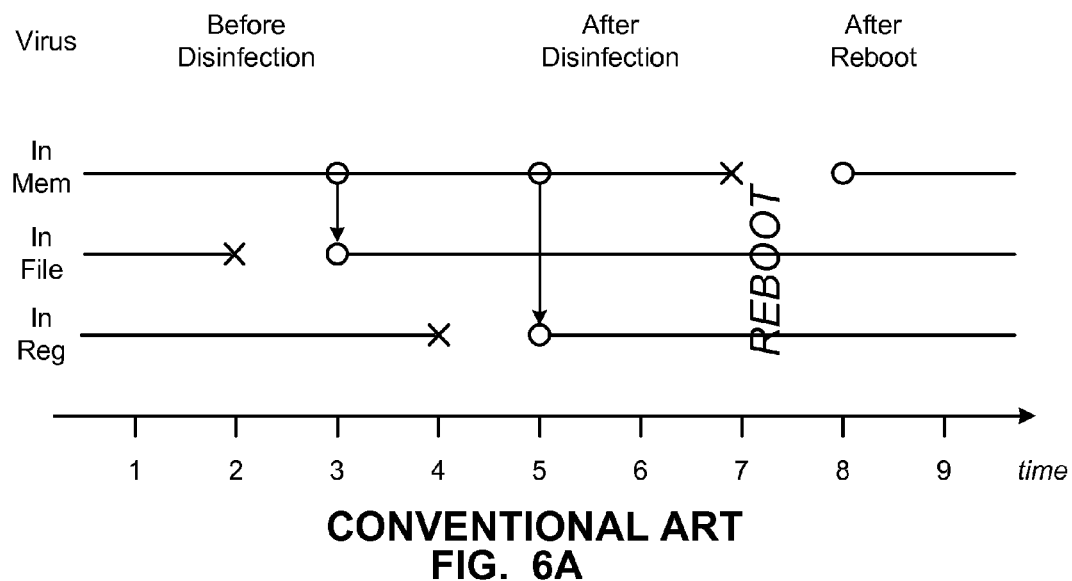
FIGS. 6A and 6B illustrate time lines for malware treatment with and without the present invention.

FIG. 6A illustrates the situation where conventional antivirus methods are used to attempt to cure a cure-resistant malicious code. As shown in FIG. 6A, a malicious file is identified and deleted at Time 2, however, at Time 3, the malware copies the executable file from random access memory (see FIGS. 4 and 5) to the hard disk drive, at Time 3. At Time 4, the malware is identified in the system registry, and the keys deleted, however, at Time 5, the malware restores the keys from the memory. Thus, when the reboot of the computer takes place at Time 7, at Time 8 the malware is still present in the memory, on the hard disk drive, and in the registry.

Figure 6B:
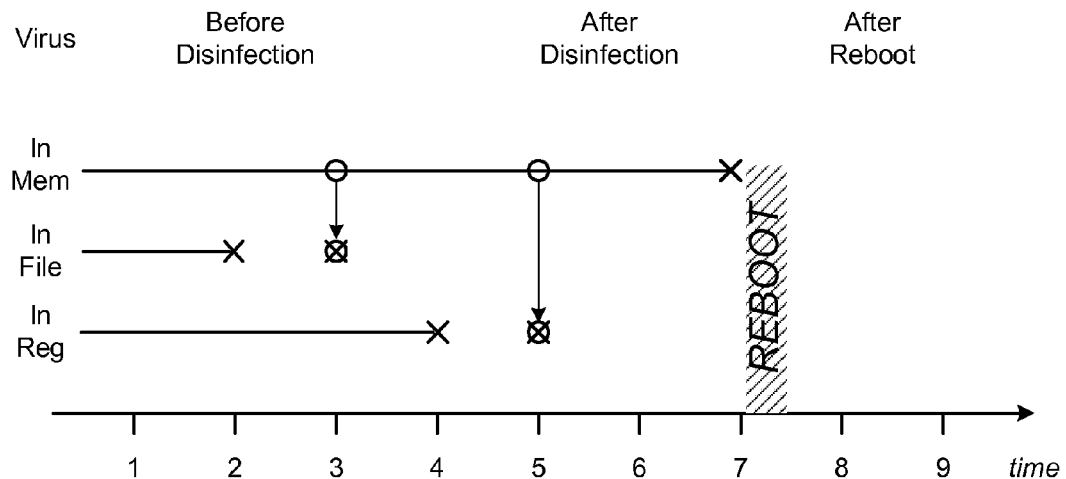

FIG. 6B illustrates the scenario where the driver 204 is used to block the malware's attempt to resist the treatment. As is shown in FIG. 6B, after the file containing the malicious code is detected and deleted at Time 2, the malicious code's attempt to create another copy of the file on the hard disk drive is blocked at Time 3. At Time 4 the malicious code's key is deleted from the system registry. At time 5 the malicious code's attempt to write another copy of the key to the system registry is blocked. Thus, after the reboot at Time 7, the system is clean.

Figure 7:
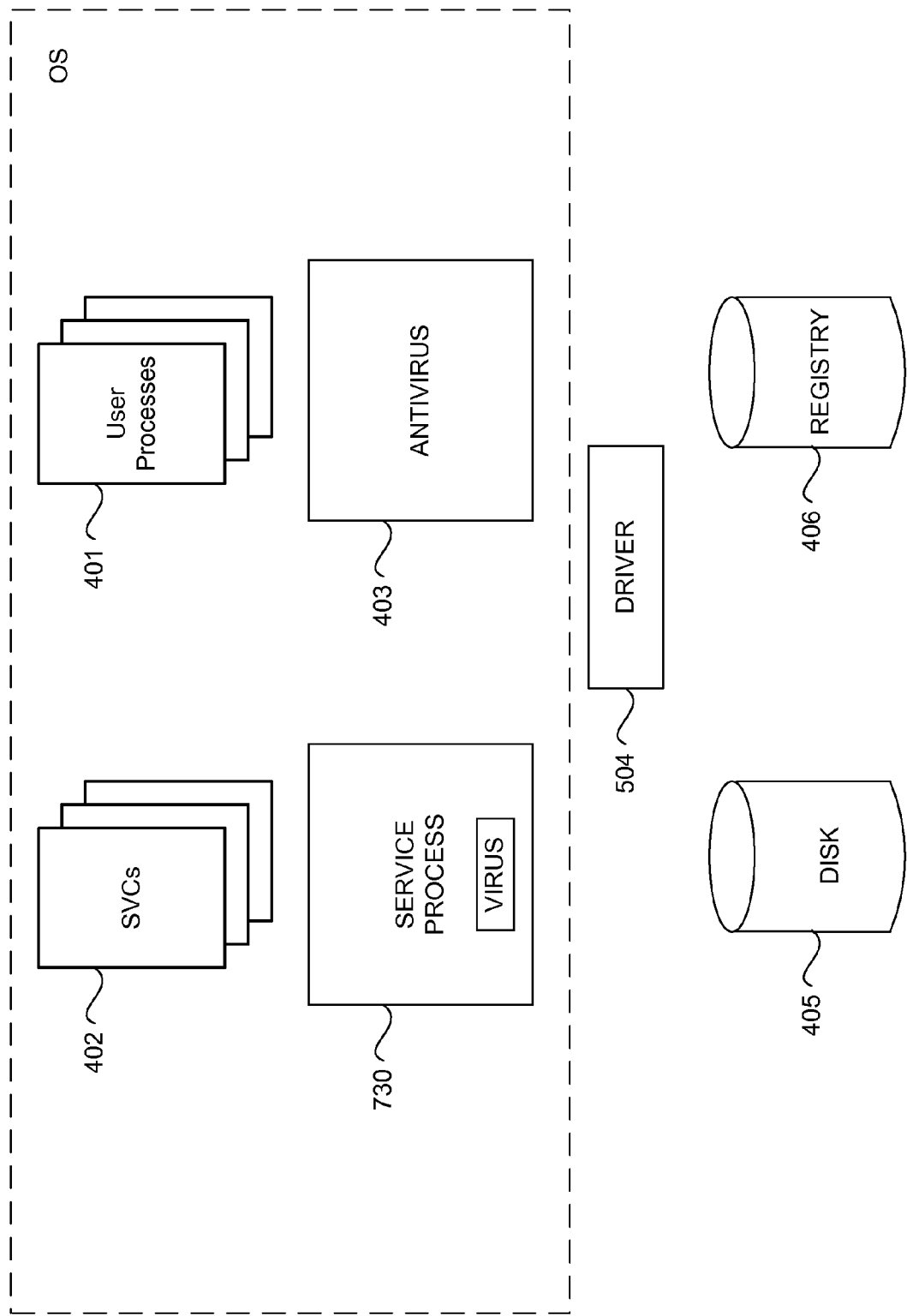
FIG. 7 illustrates treatment of a malicious code that is injected in a system service process.

Another example of a malicious code that is cure resistant is a type of malware that is embedded in the code of one of the system services 730, as is shown in FIG. 7. Such a malware cannot be treated using conventional methods without crashing the computer system. Thus, the approach described herein can also be used to cure the system of such malware. In this case, the malicious code is removed from the disk, and the operating system rebooted from a trusted image, as discussed earlier with reference to the above examples.

Figure 8:
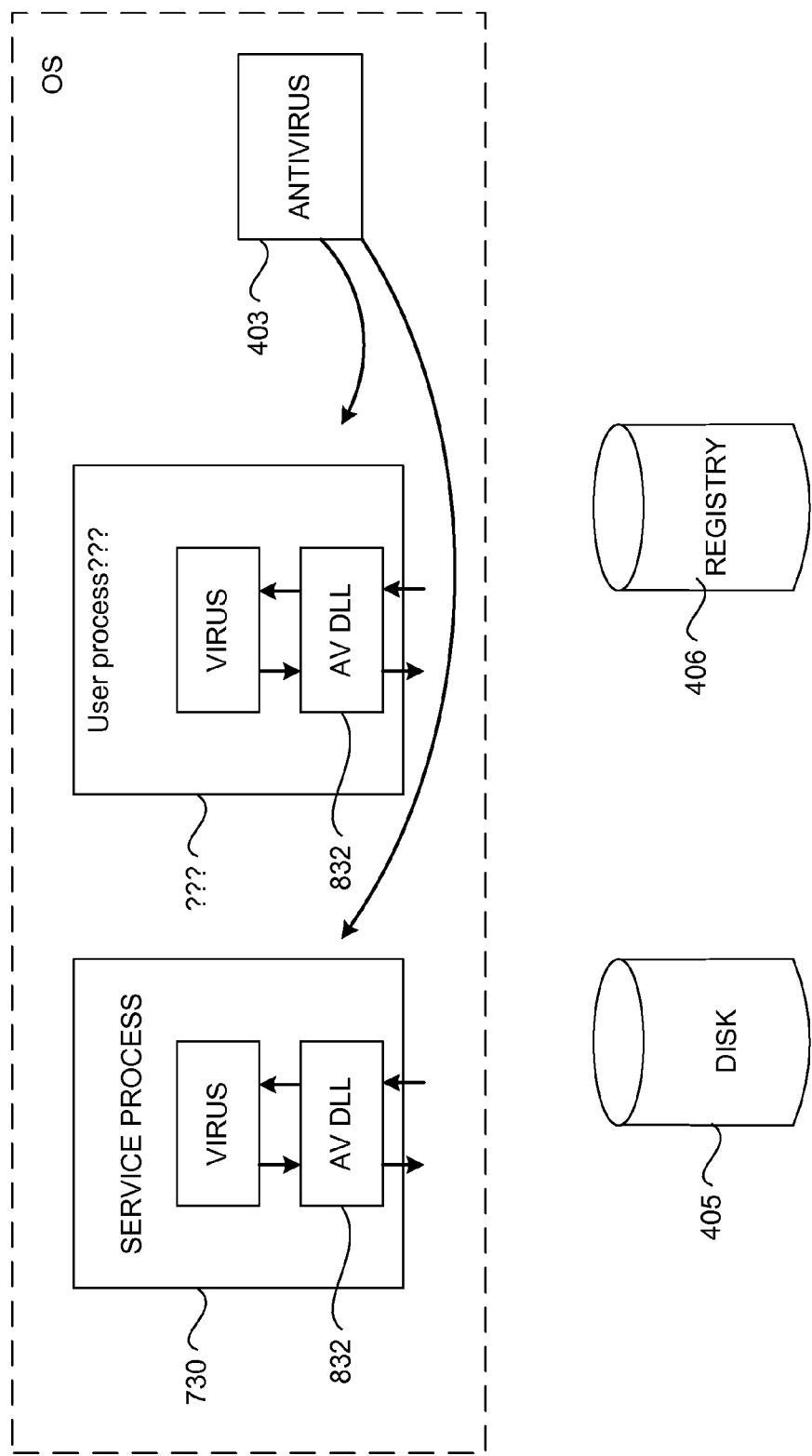
FIG. 8 illustrates the process of treatment of a malicious program using a DLL injected in a system service and a user processes.

Although the discussion above has been in terms of using a driver to block activities that would permit the malware to resist the treatment, this is not the only mechanism for doing so. Another option is to use a user-mode dynamic linked library (DLL) (see 832 in FIG. 8), which can have similar affect as a system level driver. As yet another option, additional software code can be written to the infected process, which will also function in the same manner as described earlier—blocking any attempt by the malicious code to replicate itself, or to re-infect the system before the computer is rebooted.

As yet a further option, such a means for blocking the malware's re-infection attempt can be implemented in hardware, as well as in software.

It will also be appreciated that although the discussion above has been in terms of a malware that uses multiple copies of itself running simultaneously to "stay alive," the same approach can be used even with a single copy or instance of the malicious code.

Figure 9:
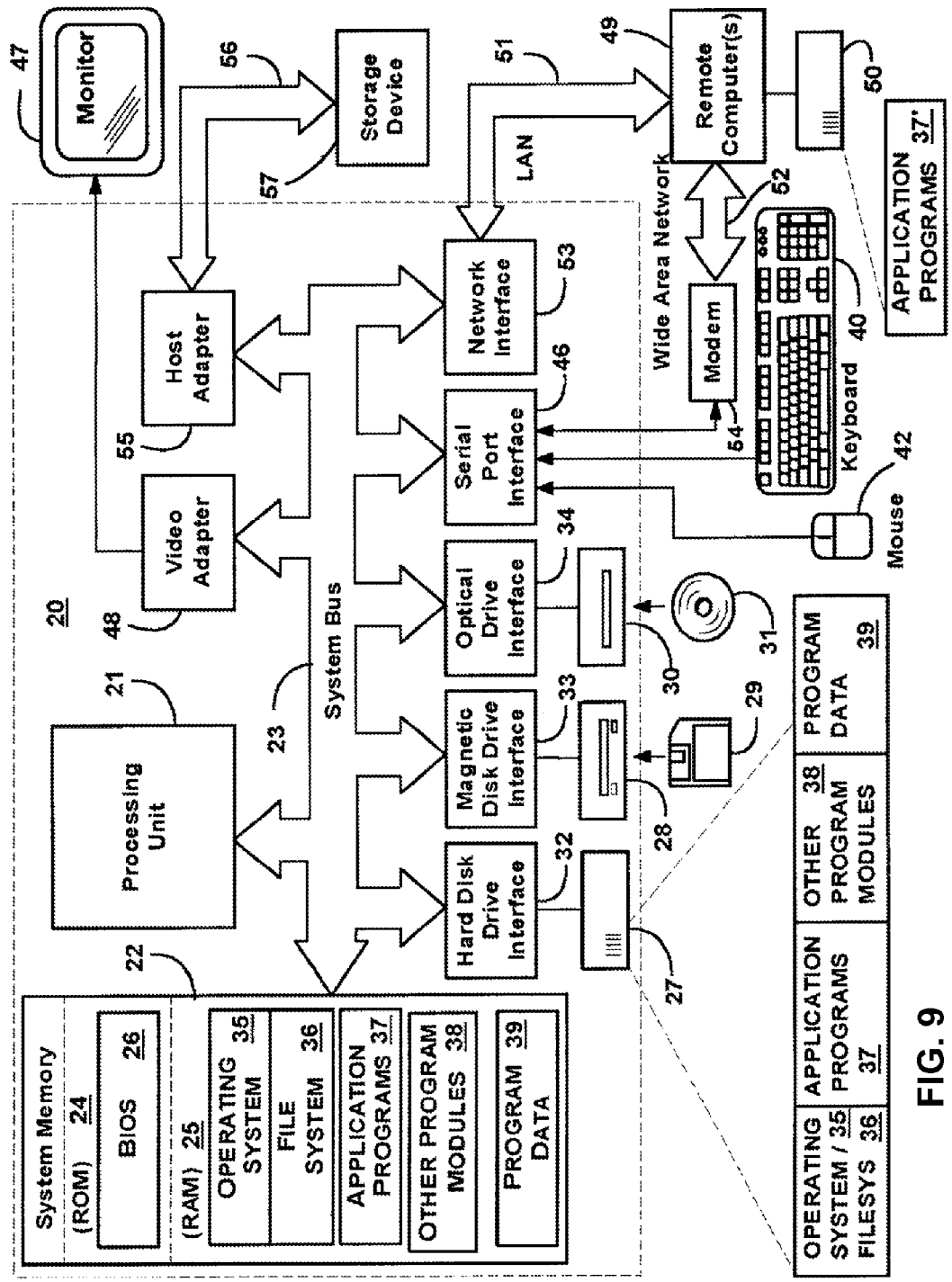
FIG. 9 illustrates a schematic of a computer system on which the malware treatment can be implemented according to one embodiment of the invention.

With reference to FIG. 9, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the personal computer 20, such as during start-up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

What is claimed is:

1. A method for treating a malware in a computer having multiple copies of the same malicious code activated, wherein the multiple copies monitor one another's existence, the method comprising:
 (a) identifying a presence of the malware on the computer by monitoring interprocess communication between multiple threads of the malware;
 (b) using an antivirus driver, blocking actions that permit one active copy of the malware to activate another copy of the malware, including blocking writes to executable files in a persistent storage and writes to a system registry, and including blocking launching of any new processes and writes to a system registry, wherein the blocking utilizes OS executable code that does not block activities of anti-malware software and permits only the antivirus driver to perform the writes;
 (c) deleting, from the persistent storage, a file containing executable code of the malware, and replacing the file with a non-infected copy;
 (d) deleting, from the system registry, keys corresponding to the malware;
 (e) maintaining the blocking until a reboot of the computer; and
 (f) warning a user about an impending reboot and terminating the blocking and any executing malware by forcing the reboot of the computer.

2. The method of claim 1, wherein the actions include disabling writes to the persistent storage.

3. The method of claim 1, wherein the actions include disabling writes to a system registry.

4. The method of claim 1, wherein the identifying step utilizes signature identification for malware detection.

5. The method of claim 1, wherein the malware is any of a virus, a trojan, a worm, a rootkit, an adware and spyware.

6. The method of claim 1, wherein the blocking utilizes a user-mode dynamic linked library that does not block activities of anti-malware software.

7. The method of claim 1, wherein the blocking utilizes software code injected into one or more infected processes.

8. A method for treating a cure-resistant malware in a computer, the method comprising:
   (a) identifying a presence of the malware on the computer by monitoring interprocess communication between multiple threads of the malware;
   (b) using an antivirus driver, blocking actions that permit the malware to activate another copy of itself, including blocking writes to executable files in a persistent storage and writes to a system registry, and including blocking launching of any new processes, wherein the blocking utilizes OS executable code that does not block activities of anti-malware software and permits only the antivirus driver to perform the writes;
   (c) deleting, the persistent storage, a file containing executable code of the malware, and replacing the file with a non-infected copy;
   (d) deleting, from the system registry, keys corresponding to the malware;
   (e) maintaining the blocking until a reboot of the computer;
   (f) deleting malicious code from the memory; and
   (g) warning a user about an impending reboot and terminating the blocking and any executing malware by forcing the reboot of rebooting the computer.

9. The method of claim 8, wherein the OS executable code includes a driver in kernel space that does not block activities of anti-malware software is loaded into kernel space.

10. The method of claim 8, wherein the blocking utilizes a user-mode dynamic linked library that does not block activities of anti-malware software.

11. The method of claim 8, wherein the blocking utilizes software code injected into one or more infected processes.

12. The method of claim 8, further comprising reloading of the OS.

13. The method of claim 8, wherein the blocking is terminated after malware treatment procedure.

14. A method for treating a cure-resistant malware in a computer, the method comprising:
   (a) identifying a presence of the malware on the computer by monitoring interprocess communication between multiple threads of the malware;
   (b) using an antivirus driver, blocking actions that permit the malware to re-infect the computer, including blocking writes to executable files in a persistent storage and writes to a system registry, and including blocking launching of any new processes, wherein the blocking utilizes OS executable code that does not block activities of anti-malware software and permits only the antivirus driver to perform the writes;
   (c) deleting, from the persistent storage, a file containing executable code of the malware, and replacing the file with a non-infected copy;
   (d) deleting, from the system registry, keys corresponding to the malware;
   (e) maintaining the blocking until a reboot of the computer; and
   (f) deleting malicious code from the memory, warning a user about an impending reboot and then terminating the blocking and any executing malware by forcing the reboot of the computer.

15. The method of claim 14, further comprising (c) reloading of the operating system (OS).

16. The method of claim 14, further comprising (e) terminating the blocking after the malicious code is deleted from memory.

17. A system for treating a malware in a computer having multiple copies of the same malware activated, wherein the multiple copies monitor one another's existence, the system comprising:
   (a) malware detection module for identifying a presence of the malware by monitoring interprocess communication between multiple threads of the malware;
   (b) an antivirus driver that blocks actions that permit one active copy of the malware to activate another copy of the malware, including blocking writes to executable files in a persistent storage and writes to a system registry, and including blocking launching of any new processes, wherein the blocking utilizes OS executable code that does not block activities of antimalware software and permits only the antivirus driver to perform the writes;
   (c) means for deleting, from the persistent storage, files containing executable code of the malware, and replacing any deleted executable files with a non-infected copy;
   (d) deleting, from the system registry, keys corresponding to the malware;
   (e) maintaining the blocking until a reboot of the computer; and
   (f) deleting malicious code from the memory, warning a user about an impending reboot and then terminating the blocking and any executing malware by forcing the reboot of the computer.

18. A non-transitory computer useable recording medium having computer executable program logic stored thereon, the computer executable program logic executing on a processor for treating a computer of malware that has multiple copies of itself activated, wherein the multiple copies monitor each other's existence, the computer program logic comprising:
   (a) computer program code means for identifying a presence of the malware by monitoring interprocess communication between multiple threads of the malware;
   (b) computer program code means for using an antivirus driver to block actions that permit one active copy of the malware to activate another copy of the malware, including blocking writes to executable files in a persistent storage and writes to a system registry, and including blocking launching of any new processes, wherein the blocking utilizes OS executable code that does not block activities of anti-malware software and permits only the antivirus driver to perform the writes;
   (c) computer program code means for deleting, from the persistent storage, files containing executable code of the malware, and replacing any deleted executable files with a non-infected copy;
   (d) computer program code means for deleting, from the system registry, keys corresponding to the malware;
   (e) computer program code means for maintaining the blocking until a reboot of the computer; and (f) computer program code means for warning a user about an impending reboot and terminating the blocking and any executing malware by forcing the reboot of the computer.

19. The method of claim 1, wherein, in step (a), the inter-process communication being monitored is a memory mapped file.

20. The method of claim 1, wherein, in step (a), the inter-process communication being monitored is a global object.

21. The method of claim 1, wherein, in step (a), the inter-process communication being monitored is a hidden window.

* * * * *